United States Patent [19]
Drutel et al.

[11] Patent Number: 5,103,668
[45] Date of Patent: Apr. 14, 1992

[54] DETECTION PROCESS AND DEVICE FOR THE ELECTRONIC INJECTION CONTROL OF A MULTICYLINDER ENGINE

[75] Inventors: Yves Drutel, Brignais; Marc Miettaux, Decines, both of France

[73] Assignee: Renault Vehicules Industriels, Lyons, France

[21] Appl. No.: 562,272

[22] Filed: Aug. 3, 1990

[30] Foreign Application Priority Data

Aug. 3, 1989 [FR] France .................. 89 10489

[51] Int. Cl.⁵ .......................... G01M 15/00
[52] U.S. Cl. .................... 73/119 A; 324/207.22
[58] Field of Search ............. 73/119 A, 117.3; 324/173, 174, 178, 179, 204.13–204.19, 204.20, 204.22, 204.25, 207.22

[56] References Cited

U.S. PATENT DOCUMENTS

| | | | |
|---|---|---|---|
| 3,786,272 | 1/1974 | Gamble et al. | 73/DIG. 3 |
| 4,574,756 | 3/1986 | Ito et al. | 73/119 A X |
| 4,752,732 | 6/1988 | Van Schoiack et al. | 324/207.18 |
| 4,783,627 | 11/1988 | Pagel et al. | 324/207.22 |
| 4,810,967 | 3/1989 | Yokoyama et al. | 324/207.2 |

FOREIGN PATENT DOCUMENTS

| | | |
|---|---|---|
| 3709092 | 9/1987 | Fed. Rep. of Germany . |
| 2441829 | 6/1980 | France . |
| 0006316 | 1/1982 | Japan .................. 324/207.22 |
| 61-258969 | 11/1986 | Japan . |
| 2183061 | 5/1987 | United Kingdom . |

*Primary Examiner*—Robert Raevis
*Attorney, Agent, or Firm*—Oblon, Spivak, McClelland, Maier & Neustadt

[57] ABSTRACT

A detection process and device for electronic injection control of a multicylinder engine of an automobile engine, which performs the functions of measuring the speed of rotation of the engine, pinpointing the angular position of the top dead center of each cylinder of the engine, and identifying at any time which one of the cylinders for which the injection of fuel is to take place. The device includes a multipolar ring provided with multiple north and south magnetic poles distributed alternately on the circumference of the ring; a pair of sensors sensitive to the magnetic field produced by the multipolar ring mounted facing the ring and spaced angularly from one another; and an electronic processing interface connected to the sensors to deliver signals to a computer for control of the electronic injection of the engine.

17 Claims, 2 Drawing Sheets

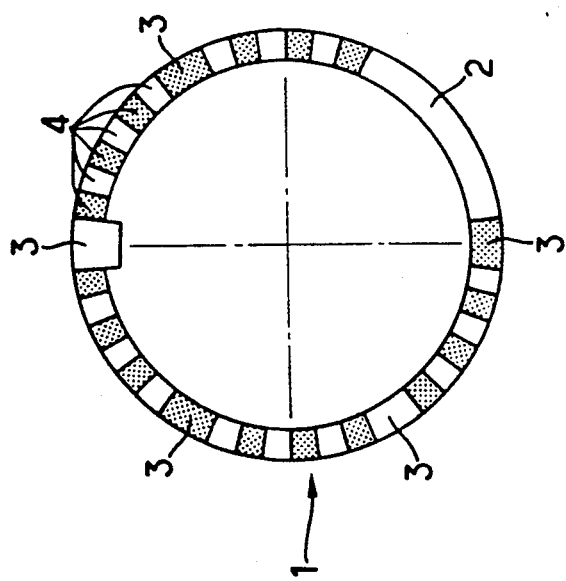
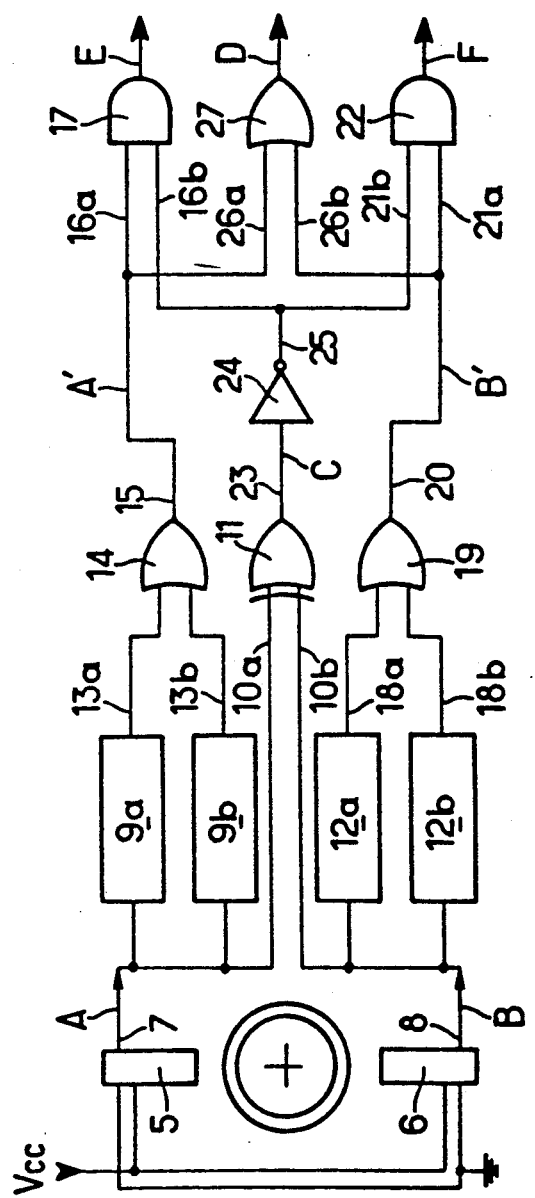
FIG. 1

DETECTION PROCESS AND DEVICE FOR THE ELECTRONIC INJECTION CONTROL OF A MULTICYLINDER ENGINE

BACKGROUND OF THE INVENTION

1. Field of the Invention

This invention relates to a detection process and a device for the injection system of a multicylinder engine, in particular of an automobile engine, making it possible to detect the speed of rotation of the engine, to perform permanently an angular pinpointing of the top dead center of each cylinder of the engine and an identification of the cylinder for which the injection of fuel is to take place.

2. Discussion of Background

Usually, the detection systems of the above-noted type include two targets in the form of ring gears mounted on the rotation shaft of the injection pump or of the engine, the targets working with two or three sensors to provide, on the one hand, the speed of rotation of the engine and the angular pinpointing of the top dead centers of the engine, and on the other hand, the identification of the cylinder in which the injection of fuel is to take place during the cycle of the engine.

Such detection systems are relatively bulky, costly and have a delicate mounting. Their principle of detection is generally based on a variation of a magnetic field created between the sensors and the ring gears of ferromagnetic material. When the speed of rotation of the engine is slow, the variation of the magnetic field is not significant enough to make possible a good measurement sensitivity. Furthermore, in the case where one of the sensors breaks down, i.e. in a mode of degraded operation of the engine, the standard measuring systems do not make it possible to provide enough data to the electronic injection control system of the engine, which causes the immediate stopping of the engine.

SUMMARY OF THE INVENTION

Accordingly, one object of this invention is to provide a novel process which reduces the drawbacks of standard measuring systems and which promotes simple and efficient detection for the electronic injection system of a multicylinder engine.

Another object of this invention is to produce a detection device for the electronic injection system of a multicylinder engine, which is multifunctional, compact, easy to mount and has a new structure.

Yet another object of this invention is to obtain an initial timing means of the injection system without using a sensor or an additional device.

Still a further object of this invention is to provide a detection device for a motor vehicle engine, able to provide enough data to the electronic injection control system in a degraded mode.

These and other objects are achieved according to the invention, by providing a new and improved process of detection including measuring the variations of a magnetic field generated by a multipolar ring fitted to the multicylinder engine and having multiple north and south magnetic poles distributed alternately on its periphery, by means of a pair of sensors which are sensitive to the magnetic field, such as Hall-effect sensors, magnetoresistant sensors or the like, and delivering an image signal of the magnetic field. The sensors are spaced angularly from one another and placed opposite the periphery of the multipolar ring which is subdivided in a number of sectors equal to the number of cylinders of the engine, one of the sectors consisting entirely of a single magnetic pole, the other sectors including plural magnetic poles.

The detection device, according to the invention, makes it possible in particular to equip an electronic injection system for a multicylinder engine, such as an engine for a motor vehicle, in particular for measuring the speed of rotation of the engine, pinpointing permanently the angular position of the top dead center of each cylinder of the engine and identifying at any time that cylinder of the engine for which the injection of fuel is to take place.

According to the invention, the device includes a rigid multipolar ring made integral around the rotation shaft of the pump of the electronic injection system and inside the pump and having distributed on its circumference multiple alternate north and south magnetic poles; two Hall-effect sensors attached inside the pump, directed radially relative to the rotational shaft of the pump opposite the outside periphery of the ring along a plane crosswise to the shaft of the pump, and spaced angularly from one another; and an electronic processing interface connected to the two sensors and able to provide detection signals for a computer for control of the electronic injection system.

According to a preferred embodiment of the invention, the multipolar ring is subdivided into as many geometrically identical sectors as there are cylinders in the engine. One of the sectors consists entirely of a single magnetic pole. Each of the other sectors includes at least two small consecutive magnetic poles each of small angular extent and a large magnetic pole whose angular extent is one and a half times greater than that of a small magnetic pole.

The presence of a monopolar sector on the ring makes it possible, in timing this sector with one of the cylinders of the engine, to be able to pinpoint the cylinder when the multipolar ring is driven in rotation by the shaft of the injection pump.

Preferably, all the small poles of the ring are of identical angular extent. All the large poles of the ring are also geometrically identical and are separated by the same distance from one another.

The two Hall-effect sensors are preferably spaced angularly from one another by a distance corresponding to a multiple of the angular extent of a sector of the multipolar ring.

The multipolar ring consists of an even pair of alternate magnetic poles on its circumference. If n is the number of cylinders of the engine, the multipolar ring then exhibits n sectors, one of which consists of a single magnetic pole. The $n-1$ other sectors of the ring then include on the whole an odd number of magnetic poles.

In the case where the engine has an even number of cylinders, i.e. when n is an even number, the $n-1$ sectors, odd in number, can each include an odd number of alternate magnetic poles to obtain an odd number of magnetic poles for all of the $n-1$ sectors of the ring. Each of said $n-1$ sectors then preferably has a large pole and an even number of successive small poles.

In the case where the number n of cylinders of the engine is odd, the $n-1$ sectors, even in number, of the multipolar ring are to exhibit an odd number of magnetic poles on the whole. It can then be considered to provide one of the $n-1$ sectors with a different number of magnetic poles than that of the remaining $n-2$ sectors which have a number of magnetic poles which are identical with one another. In other words, when the n−2 sectors each exhibit an even number of poles, the other of the n−1 sectors has an odd number of poles; when each of the n−2 sectors has an odd number of poles, the other of the n−1 has an even number of magnetic poles.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, where:

FIG. 1 is a schematic illustration of a multipolar ring according to the invention;

FIG. 2 is a schematic circuit diagram showing the operation of the device of the invention.

DESCRIPTION OF THE PREFERRED EMBODIMENTS

Figure 3:
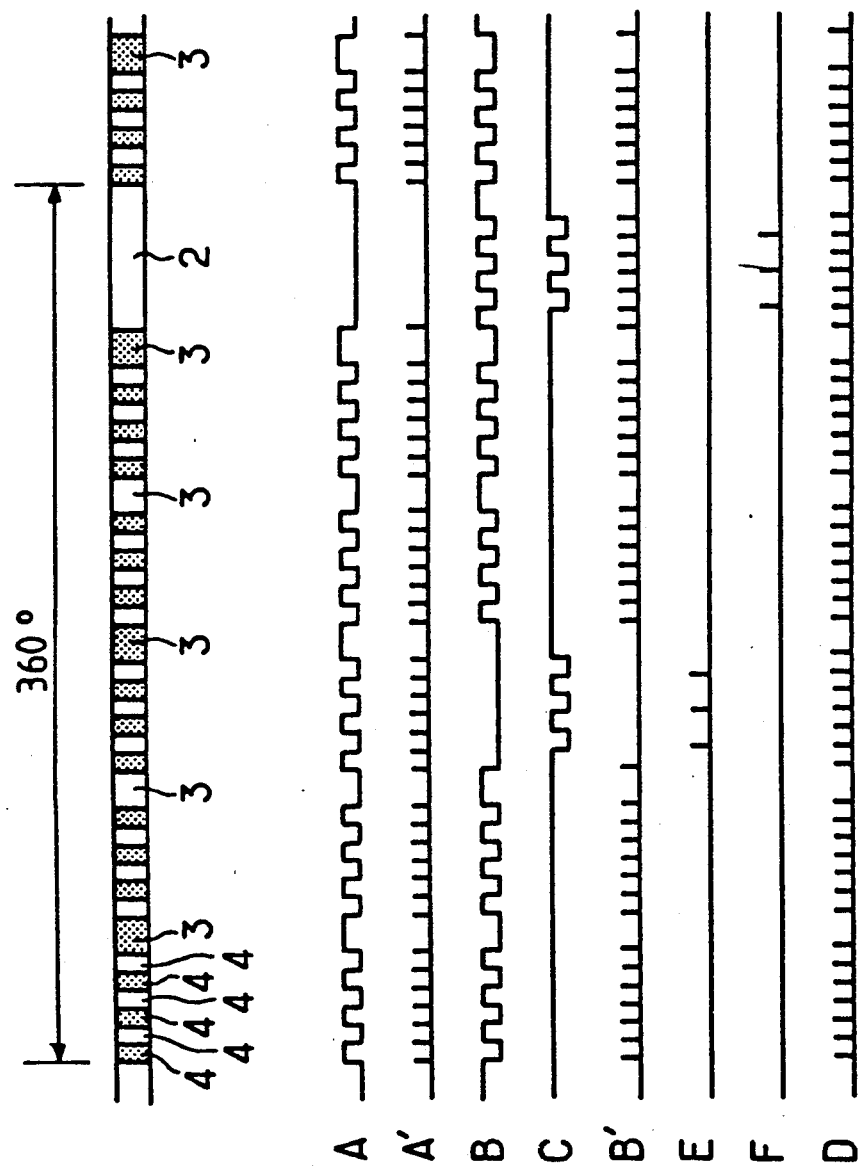
FIG. 3 is a waveform timing diagram showing the signals generated by the device of the invention corresponding to FIG. 2.

Referring now to the drawings, wherein like reference numerals designate identical or corresponding parts throughout the several views, and more particularly to FIG. 1 thereof, the detection device according to the invention includes a rigid multipolar ring 1 mounted around the rotation shaft, not shown, of the pump of the electronic injection system of a motor vehicle engine and inside the pump. The diameter of ring 1 is to be relatively small, on the order of 40 mm, to make possible its mounting inside the pump. The ring is to be made of a magnetically polarizable rigid material such as plastoferrite or another material making it possible t support the magnetic poles.

In this example, multipolar ring 1 consists of 36 alternate north and south magnetic poles, 35 of which are distributed over 300°, the 36th magnetic pole occupying a complete sector 2 of 60°. Ring 1 being subdivided into six sectors of 60°, each of the five sectors other than sector 2 includes 7 alternately north-south consecutive magnetic poles, the 7th magnetic pole 3 being two times more extended angularly than each of the six other magnetic poles 4 of the sector. Each of the six sectors of the multipolar ring 1 corresponds to a cylinder of a six-cylinder motor vehicle engine, not shown.

As is illustrated in FIGS. 2 and 3, the device of the invention further includes two sensors 5 and 6 attached to the housing of the injection pump and positioned diametrically opposite facing the multipolar ring with an air gap on the order of 0.4 mm. Sensors 5 and 6 are equipped with Hall-effect technology to be able to detect the differences of a magnetic field generated by two successive magnetic poles with opposite polarity. They each comprise an electronic shaping means, not shown, of electronic signals, to be able to generate two binary states; a lower state facing a magnetic pole of one polarity and an upper state facing the magnetic pole of a different polarity.

Hall-effect sensors 5 and 6 are fed by a dc voltage source Vcc and deliver binary signals A and B at their respective outputs 7 and 8. Signal A at output 7 of sensor 5 respectively feeds a leading edge monostable 9a, a trailing edge monostable 9b and an input 10a with an exclusive OR logic gate 11. Likewise, signal B at output 8 of sensor 6 respectively feeds a leading edge monostable 12a, a trailing edge monostable 12b and a second input 10b of logic gate 11.

Outputs 13a and 13b of monostables 9a and 9b are connected to the inputs of an OR logic gate 14 whose output 15 is connected to an input 16a of an AND logic gate 17. Likewise, outputs 18a and 18b of monostables 12a and 12b are connected to the inputs of an OR logic gate 19 whose output 20 is connected to an input 21a of a second AND logic gate 22.

Output 23 of exclusive OR logic gate 11 is connected to an inverter 24 whose output 25 is connected respectively to a second input 16b of first AND logic gate 17 and to second input 21b of second AND logic gate 22.

Outputs 15 and 20 of OR logic gates 14 and 19 are also connected respectively to inputs 26a and 26b of a third OR logic gate 27.

Monostables 9a, 9b, 12a, 12b, logic gates 11, 14, 17, 19, 22, 27, invertor 24 as well as their connections constitute the electronic processing interface of the device according to the invention.

On the upper part of FIG. 3, multipolar ring 1 is shown in development over 360°. The lower part of FIG. 3 shows the signal sequences generated at various stages of the device of the invention.

Signals A and B generated by two Hall-effect sensors 5 and 6 are processed by the electronic interface which has the role of creating signals D, E and F which are necessary for the computer for control of the electronic injection.

Binary signal A at output 7 of sensor 5 is processed first of all by monostables 9a and 9b and added by OR logic gate 14 whose output 15 delivers a signal A' in the form of pulses. Each of these pulses corresponds to a binary state change of signal A and therefore to a passage from a magnetic pole to the nest pole of a different polarity of multipolar ring 1. Likewise, signal B' in the form of pulses represents the binary transitions of signal B with the help of monostable 12a, 12b and OR logic gate 19.

Signals A' and B' are summed by OR logic gate 27 to generate an output signal D, which provides to the control computer a signal identical for each 60° rotation of the engine. Signal D thus makes it possible for the computer to control the speed of rotation of the engine seven times each 60°, six times regularly spaced by 7.5° and a seventh time spaced by 15°, this last pulse distinguished from the preceding ones making it possible for the computer to obtain an angular reference for the top dead center of each cylinder.

Inputs 10a and 10b of exclusive OR logic gate 11 are connected respectively to outputs 7 and 8 of sensors 5 and 6. After having gone through logic gate 11, binary signals A and B become a binary signal C which will be complemented by inverter 24. AND logic gates 17 and 22 make it possible, from the complement of signal C and signals A' and B', to obtain signals E and F respectively which will be transmitted to the computer.

Signals E and F generated by the interface make it possible to give information to the computer on the pinpointing of the cylinder to be controlled on the cycle of the engine (six cylinders in this example). Each of signals E and F makes it possible to pinpoint one cylinder of three at each rotation of the engine, and therefore makes it possible for the computer to control the cylinder to be controlled.

The presence of three calibrated pulses in each of signals E and F for the pinpointing a cylinder will make it possible for the computer to distinguish the parasitic pulses of the signal actually generated by the multipolar ring. This makes possible a good immunity to noise and prevents any disturbing operation of the device.

The detection device, according to the invention, therefore makes it possible for injection control to inform the computer of the speed of rotation of the engine; the angular position corresponding to the top dead center of each cylinder of the engine; and the cylinder to be controlled of the six possible cylinders on a complete rotation of the injection pump.

The provision of Hall-effect sensors 5 and 6 makes it possible to have north pole or south pole binary data with a clear transition from one pole to the other even at a very low speed of rotation of the engine, which makes it possible to have a good detection sensitivity of the device.

Moreover, the combination of two sensors 5 and 6 and the multipolar ring, according to the invention, makes is possible, in the case where one of the sensors breaks down, to generate enough data to control the injection system to be able to continue using the engine in a degraded mode.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Device for detection of the angular position and measurement of the angular speed of the shaft of an injection pump of a multicylinder engine, comprising:
   a rigid multipolar ring integral with the shaft of the pump and comprising multiple north and south magnetic poles distributed alternately on its periphery and being subdivided into a number of sectors equal to the number of cylinders of the engine, one of the sectors consisting entirely of a single magnetic pole; and
   means for measuring variations of a magnetic filed generated by said multipolar ring including sensors sensitive to the magnetic field angularly spaced from one another and disposed opposite the periphery of the ring.

2. Detection device for measuring the speed of rotation of a multicylinder engine, pinpointing permanently the angular position of the top dead center of each cylinder of the engine and identifying at any moment which one of the cylinders of the engine for which injection of fuel takes place, comprising:
   a rigid multipolar ring made integral around the shaft of a pump of an electronic injection system inside the pump and on the circumference of which are distributed multiple alternate north and south magnetic poles;
   two Hall-effect sensors each juxtaposed radially relative to the rotation shaft of the pump opposite the outside periphery of the multipolar ring and spaced angularly from one another; and
   an electronic processing interface connected to said two Hall-effect sensors, for producing detection signals for a computer for control of the electronic injection system;
   wherein said multipolar ring comprises as many geometrically identical sectors as there are cylinders of the engine, one of the sectors entirely consisting of a single magnetic pole, each of the other sectors comprising of at least a plurality of small consecutive magnetic poles and a large magnetic pole at one end.

3. Detection device according to claim 2, wherein said small poles are of identical size and said large poles are of identical size and spaced from one another at the same distance, the size of each large pole being at least one and a half times greater than the size of a small magnetic pole.

4. Detection device according to claim 3, wherein said Hall-effect sensors are spaced from one another at a distance corresponding to a multiple of the extent of a sector of said multipolar ring.

5. Detection device according to claim 3, wherein when the engine comprises an even number of cylinders, each sector of the multipolar ring comprises an odd number of magnetic poles.

6. Detection device according to claim 3, wherein when the engine comprises an odd number of cylinders, with the exception of sector with said single magnetic pole, one of the sectors of multipolar ring comprises magnetic poles the number of which is different from the other remaining sectors, each of said remaining sectors comprising the same number of magnetic poles relative to one another.

7. Detection device according to claim 2, wherein said Hall-effect sensors are spaced from one another at a distance corresponding to a multiple of the extent of a sector of said multipolar ring.

8. Detection device according to claim 7, wherein when the engine comprises an odd number of cylinders, with the exception of sector with said single magnetic pole, one of the sectors of multipolar ring comprises magnetic poles the number of which is different from the other remaining sectors, each of said remaining sectors comprising the same number of magnetic poles relative to one another.

9. Detection device according to claim 2, wherein when the engine comprises an even number of cylinders, each sector of the multipolar ring comprises an odd number of magnetic poles.

10. Detection device according to claim 2, wherein when the engine comprises an odd number of cylinders, with the exception of sector with a single magnetic pole, one of the sectors of multipolar ring comprises magnetic poles the number of which is different from the other remaining sectors, each of said other remaining sectors comprising the same number of magnetic poles relative to one another.

11. Detection device according to claim 2, wherein when the engine comprises an even number of cylinders, each sector of the multipolar ring comprising an odd number of magnetic poles.

12. Detection device according to claim 2, wherein said multipolar ring comprises an even number of magnetic poles placed alternately on its circumference.

13. Detection device according to claim 12, wherein said small poles are of identical size and said large poles are of identical size and spaced from one another at the same distance, the size of each large pole being at least one and a half times greater than the size of a small magnetic pole.

14. Detection device according to claim 12, wherein said Hall-effect sensors are spaced from one another at a distance corresponding to a multiple of the extent of a sector of said multipolar ring.

15. Detection device according to claim 12, wherein when the engine comprises an even number of cylinders, each sector of the multipolar ring comprises an odd number of magnetic poles.

16. Detection device according to 2, wherein the electronic interface comprises:

two pairs of monostables, the monstables of one pair each having an input connected to one of the Hall-effect sensors and an output connected to a first and second OR logic gate, the monstables of the second pair each having an input connected to the other of the Hall-effect sensors and an output connected to a second OR logic gate;

an exclusive OR logic gate having inputs connected respectively to outputs of said Hall-effect sensors;

an inverter connected to the output of said exclusive OR logic gate to feed respectively one input of each of first and second AND logic gates, each of which has another input connected respectively to outputs of said first and second OR logic gates;

a third OR logic gate having inputs connected respectively to outputs of said first and second OR logic gates, so that detection signals (A, B) coming from said sensors are processed to output signals (D, E, F) respectively coming from said third OR gate and said first and second AND gates to give information to the computer for control of electronic injection.

17. Detection device according to claim 2, wherein said small poles are of identical size and said large poles are of identical size and spaced from one another at the same distance, the size of each large pole being at least one and a half times greater than the size of a mall magnetic pole.

* * * * *